TOOL LOCATION IN AUTOMATICALLY CONTROLLED MACHINE TOOLS

Original Filed July 22, 1963 3 Sheets-Sheet 1

INVENTOR
David T. N. Williamson
By Walter, Ole, Spindle & Witter
ATTORNEYS

TOOL LOCATION IN AUTOMATICALLY CONTROLLED MACHINE TOOLS

Original Filed July 22, 1963 3 Sheets-Sheet 2

INVENTOR
David T. N. Williamson
By Watson, Cole, Grindle & Watson
ATTORNEYS

TOOL LOCATION IN AUTOMATICALLY CONTROLLED MACHINE TOOLS

Original Filed July 22, 1963 3 Sheets-Sheet 3

INVENTOR
David T. N. Williamson
By Watson, Cole, Grindle & Watson
ATTORNEYS

United States Patent Office

Re. 25,956
Reissued Feb. 22, 1966

25,956
TOOL LOCATION IN AUTOMATICALLY CONTROLLED MACHINE TOOLS

David Theodore Nelson Williamson, London, England, assignor to The Molins Organisation Limited, a British company Original No. 3,171,327, dated Mar. 2, 1965, Ser. No. 296,763, July 22, 1963. Application for reissue July 22, 1965, Ser. No. 475,626
Claims priority, application Great Britain, July 27, 1962, 28,962/62
6 Claims. (Cl. 90—11)

Matter enclosed in heavy brackets [ ] appears in the original patent but forms no part of this reissue specification; matter printed in italics indicates the additions made by reissue.

This invention concerns improvements in or relating to a method of and apparatus for selecting and locating a cutting tool in a cutter head of a numerically controlled machine tool.

Present day practice in the engineering industry tends to lead to the production of components on a large scale. Where such components are made from metal which is to be machined, cut or fashioned to the required shape, it has become usual to perform successive operations on different machines, each of which has been tooled and set up for that one particular operation. The workpiece may be transferred from machine to machine after each operation, either manually or automatically, until the whole machining or fashioning process has been completed. The machine tools may be numerically or programme controlled since this has led to cost economies due to reduced machining time.

Whilst this practice is suitable for components to be produced in large batches, it may prove uneconomic if the required quantity is small or relatively small, since then the setting-up time becomes large in relation to the total machining time. It might in some cases be possible to revert to manually controlled multi-purpose machine tools for small batches but usually this increases costs due to increased machining time and, possibly, to additional inspection requirements. It has, therefore been proposed to use a multi-purpose numerically controlled machine tool capable of carrying out as many machining operations as possible and it is believed that this may help to reduce costs for batches of components to be produced in small quantities or even singly. Accordingly, the setting-up time should be as short as possible. It, therefore, becomes desirable to have the machine tool designed to be able to change cutting or other types of tool as quickly as possible when desired either during machining operation or on completion of one batch and before starting another, and to be able to locate the selected tool accurately within the machine tool's cutter head.

The accurate location of the cutting tool within the cutter head presents few difficulties in two dimensions, i.e. those dimensions in a plane transverse to the axis of the cutting tool since it is gripped within a chuck or collet. The location in the third dimension i.e. along its own axis, does cause difficulties since the length of the tool itself is only nominal whilst the act of being gripped may cause it to move. Whilst small differences in the location of the tool end in this direction along its own axis may not be of any great importance for rough machining such as is involved in cleaning up the face of a casting, for contour milling such differences cannot be allowed except with the design limits of the machine tool itself. Consequently it is desirable to be able to locate the tool cutting end with a high degree of accuracy in a direction along its axis, to say .0005" or better.

According to the present invention there is provided a method of gripping a selected tool from a plurality of tools and of locating it in a spindle of the cutter head of a numerically controlled machine tool, comprising the successive steps of: positioning the cutter head and the plurality of tools so that the longitudinal axes of the spindle and the selected tool are aligned with the shank of the selected tool directed towards the cutter head; reducing the distance between the cutter head and the plurality of tools until the shank of the selected tool is inserted into the spindle; causing the shank to be gripped in the spindle; withdrawing the selected tool by moving apart the cutter head and the plurality of tools; repositioning the cutter head opposite a surface of the machine tool; causing the shank to be free to move in the spindle; reducing the distance between the cutter head and the surface to a desired value whereby the cutting end of the tool is abutting the surface; and causing the shank to be gripped in the spindle with its cutting end the same distance from the cutter head as the said desired value.

The distance between the cutter head and the plurality of tools may be reduced to a figure whereby the distance of the cutting end of the selected tool from the cutter head exceeds the said desired value.

Further according to the invention there is provided a numerically controlled machine tool comprising a cutter head, a surface to which is fixed a workpiece, opposed to the cutter head, and a magazine adjacent the surface containing a plurality of cutting tools having their shanks directed towards the cutter head, the cutter head having a spindle in which is located a collet actuated to grip the shank of a selected cutting tool and the surface having a datum pad against which the cutting end of the selected cutting tool is capable of being abutted. The collet may be actuated to close by the application of a force acting in the direction of the longitudinal axis of the selected cutting tool, the said force being transformed by the collet into a gripping force acting normally to the shank of the selected cutting tool which is thereby maintained in a stationary position relative to the spindle.

*Thus, it can be seen that the arrangement of the present invention is such that the selected cutting tool and the workpiece are mounted in opposed relationship to each other such that relative rotation between the same is provided to effect the desired machining operation.*

The magazine may comprise a series of openings, into each of which a holster fits, each holster being adapted to grip the cutting end of a cutting tool, and may be fixed to the said surface and the holsters form an array in which shanks of the cutting tools housed therein project parallel to each other.

The cutter head may be movable in a horizontal plane and the surface is movable in a vertical plane.

Apparatus in accordance with the invention will now be described by way of example with reference to the accompanying drawings in which.

Figure 1:
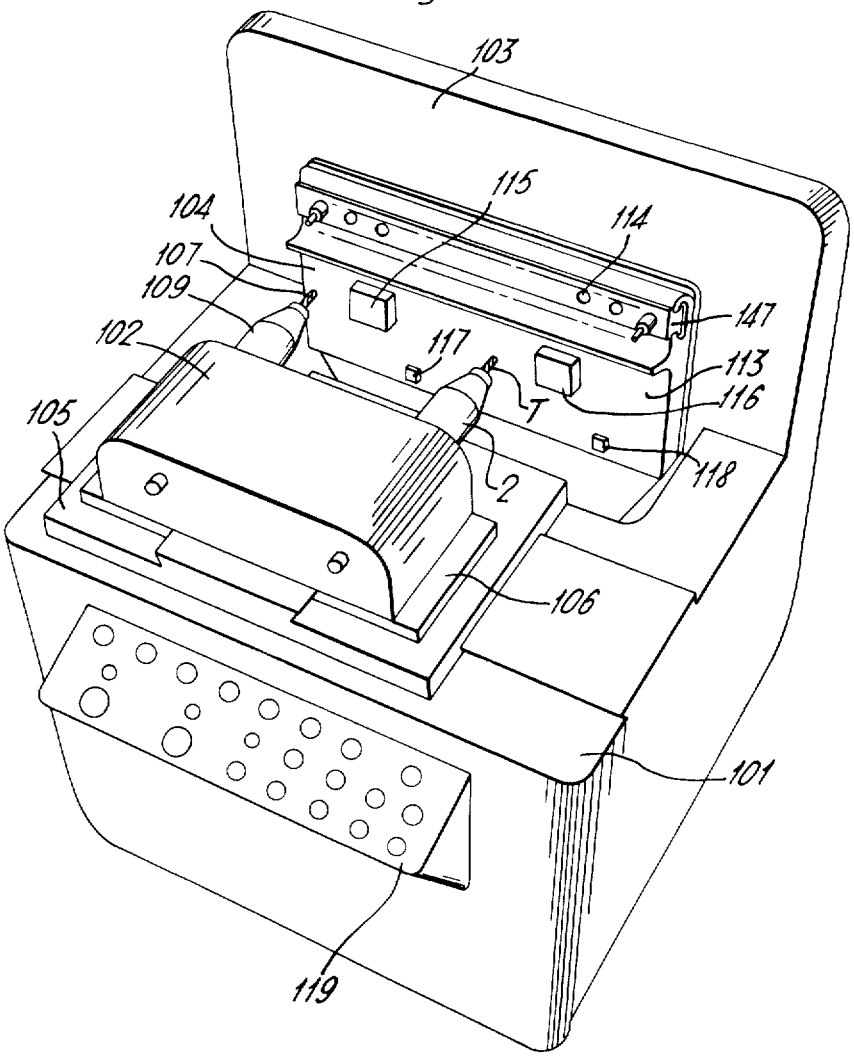
FIGURE 1 is a perspective view of a numerically controlled machine tool.

The numerically controlled machine tool shown in FIGURE 1 consists of a slide table 101 carrying a cutter head 102 and of a vertical member 103 to which is attached a work surface, in this case a pallet, 104. The cutter head 102 possesses two degrees of freedom of movement, a traversing slide 105 for movement across the slide table 101 and a feed slide 106 which moves on and at right angles to the traversing slide 105. The cutter head 102 is integral with the feed slide 106 and is adapted to hold two cutting tools 107 and T which are inserted and gripped in a manner to be described hereinafter in quills 109 and 2. The pallet 104 possesses one degree of freedom of movement, i.e. in a vertical direction, and is attached to a vertical slide table 113 provided with ten openings 114 facing towards the cutter head 102. Two workpieces 115 and 116 are fixed to the work surface of the pallet 104 [and] *so that said tools 107, T and said workpieces 115, 116 are mounted in opposed relationship to each other such that relative rotation between the same is provided to effect the desired machining operation. Also mounted on the pallet 104 in a position* lower down and to the right of the workpieces there are two pads 117 and 118. The spacing between the two workpieces 115 and 116 and between the two pads 117 and 118 is the same as that between the two quills 109 and 2. Thus the machine shown in FIGURE 1 is suitable for machining two workpieces simultaneously. The spacing of the openings 114 is similarly arranged. The space between the first opening and the sixth opening (numbering the openings consecutively from one side or the other) is the same as that between the two quills 109 and 2 and is identical with that between the second and seventh openings, the third and eighth, the fourth and ninth and between the fifth and tenth openings.

Figures 3, 4:
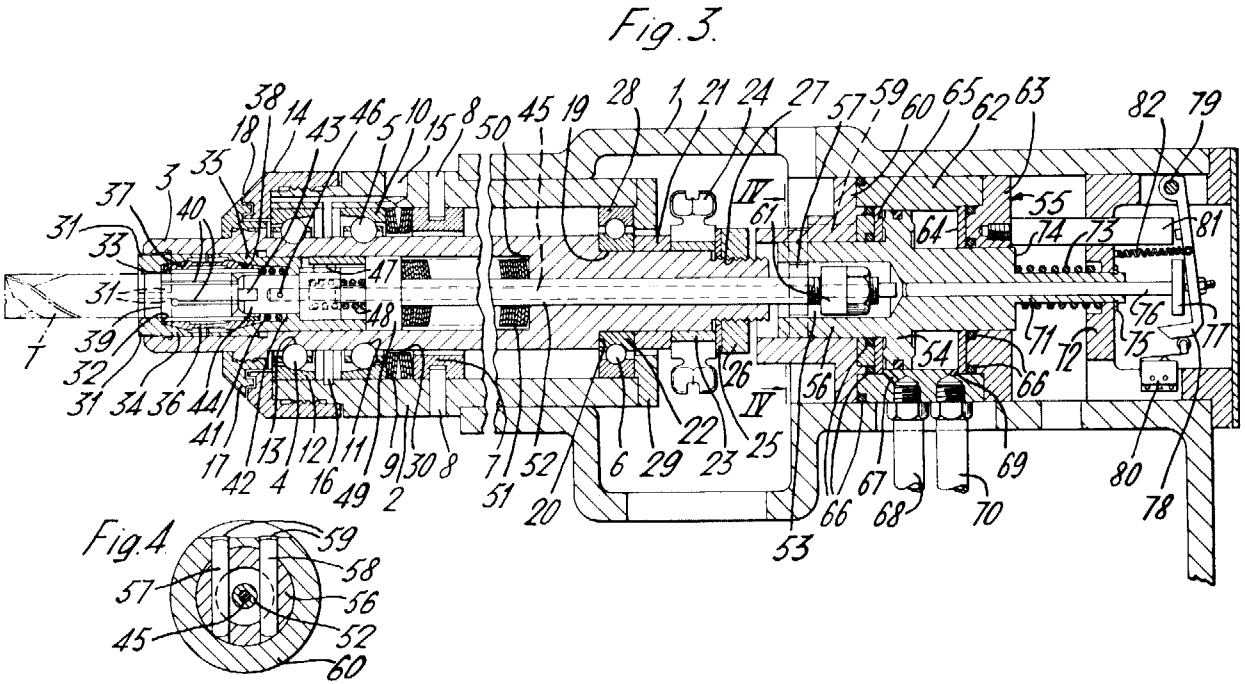
FIGURE 3 is a section through a cutter head of the machine tool of FIGURE 1.
FIGURE 4 is a section on the line IV—IV of FIGURE 3.

Automatic control mechanism is not shown in FIGURE 1, although a control panel is indicated at 119. It is, however, of known design operating on known principles embodying, for example, a punched or magnetic tape containing operating instructions. In FIGURE 3 the quill 2 is fixed to the casting 1. A rotating spindle 3 is positioned within the quill 2, from which it is separated by two angular contact bearings 4 and 5 and a plain ball bearing 6. A locating ring 7 is fixed to the bore of the quill 2 by means of dowels 8. Concave-convex washers 9, known as Belleville washers, separate an outer race 10 of the angular contact bearing 5 and the locating ring 7, and being compressed supply the force necessary to preload the balls of the bearing 5 between the outer race 10 and an inner race 11 machined around the spindle 3 and thus to prevent axial play. The bearing 4 has an outer race 12 which fits into the bore of the quill 2. An inner race 13 is machined around the spindle 3. A lock nut 14 is threaded over the quill 2 and bears against the outer race 12, thus supplying the force necessary to pre-load the balls of the bearing 4. The bearing 4 is fitted to take away any forward axial thrust and the bearing 5 to take backward axial thrust. Oil mist lubrication is supplied to both bearings 4 and 5 through a hole 15 and a circumferential channel 16 in the quill 2. A guard ring 17 is threaded on the spindle 3 and provides a labyrinthine passage 18 between it and the lock nut 14, thus preventing the entry of foreign matter without allowing excessive escape of oil.

The back end of the spindle 3 has a reduced diameter 19 and a shoulder 20. A spacer 21 nips the inner race 22 of the ball bearing 6 against the shoulder 20 and is held in position by a hub 23 of a pelton wheel 24. The individual buckets of the pelton wheel 24, which is a high speed wheel operated by an oil jet, are secured to the hub 23 by a lock washer 25, which in its turn is locked into position by a nut 26 threaded over a further reduced diameter 27 of the spindle 3. The outer race 28 of the ball bearing 6 is held in position by a locking ring 29 secured to the quill. Lubrication for the bearing 6 is supplied by the oil mist pressure being transmitted through a clearance 30 between the spindle 3 and the bore of the Belleville washers 9.

The front end of the spindle 3 is bored to mate with the front end of a nose tube 34. The front peripheral end of the nose tube 34 forms a truncated cone, whilst internally it is provided with a shoulder 32 and a taper 33. Restraining means, a retaining ring 31 which for the sake of assembly is split into four quadrants, is interposed between the bore of the spindle 3 and the truncated cone of the nose tube 34. The function of the ring 31 is to cause the nose tube 34 to lock against the internal taper of the spindle 3. Thus the nose tube 34 cannot move forwards when a forward axial force is applied to it. The back periphery of the nose tube 34 is a sliding fit within the bore of the spindle 3. A compression tube 35 also forms a sliding fit within the bore of the spindle 3 and is provided with an internal taper, the slope of which opposes that of the taper of the nose tube 34. A collet 36 fits within the nose tube 34 and the compression 35. The collet 36 has a front frustroconical end 37 which mates with the internal tapers of the nose tube 34, and has a back frustro-conical end 38, which mates with the internal taper of the compression tube 35. A sleeve 39, provided with slits 40, fits inside the collet 36. The front end of the sleeve 39 is held against the shoulder 32 of the nose tube 34 by the action of a spring 41 bearing against a shoulder 42 of the compression tube 35.

A cutting tool T fits within the sleeve 39, its back end having a dog 43 which fits in a recess of a plunger 44. A push rod 45 is attached to the plunger 44 by means of a pin 46. An enlarged portion of the plunger 44 is fixed against relative rotary movement to the compression tube 35 by a key 47. The plunger 44 is however, movable axially relative to the compression tube 35, since the key 47 is slidable within elongated keyways. The plunger 44 is held in its front position by a spring 48 bearing against a piston 49 which is slidable within the bore of the spindle 3. The space between the back of the piston 49 and a shoulder 50 of the spindle 3 is occupied by Belleville washers 51. The assembly of the retaining ring 31, the nose tube 34, the collet 36, the compression tube 35 and the piston 49 is such that the Belleville washers 51 are in a state of compression and thus act to force the compression tube 35 forwards. The push rod 45 is slidable within a draw bar 52 which is integral with the piston rod 49.

Both the push rod 45 and the draw bar 52 extend beyond the back end of the spindle 3 into a recess 53 within a hydraulic piston 54 which is slidable within a composite cylinder 55. A through piston rod 56 is integral with the piston 54, with its front end drilled to take two pins 57 and 58 (see FIGURE 2). The heads of the pins 57 and 58 are slidable in grooves 59 in a front cylinder head 60 of the cylinder 55. A bearing ring 61 is threaded onto the back end of the draw bar 52, along which its position is adjustable.

The cylinder 55 comprises a barrel 62 to which is fixed the front cylinder head 60 and a back cylinder head 63. End plates 64 and 65 are fixed respectively between the back cylinder head 63 and the barrel 62 and between the front cylinder head 60 and the barrel 62. O rings 66 seal the cylinder area so that the hydraulic fluid is prevented from leaking to atmosphere. The front cylinder area is connected via a passage 67 in the barrel 62 to a flexible hose 68 which communicates directly to a 1,500 p.s.i. hydraulic main. The back cylinder area communicates via a passage 69 to a flexible hose 70 which can be connected through a three-way selector (not shown) to the 1,500 p.s.i. hydraulic main or to a tank.

The back end of the piston rod 56 is provided with an extension 71 which projects through a bracket 72 attached to the casting 1. A spring 73 urges the piston rod 56 forwards and bears between the bracket 72 and a shoulder 74. Forward movement of the piston rod 54 is restricted by a circlip 75 in the extension 71 coming into contact with the bracket 72.

A second push rod 76 extends through the piston rod 56 and is provided with a pusher face 77 at its back end. The pusher face is operable to move two arms, only one of which, 78, can be seen in FIGURE 1. The two arms 78 swing about pivots 79 fixed to the casting 1 and in moving anti-clockwise about their pivots 79 trip microswitches 80, of which only one again can be seen in FIGURE 1. A stop 81 attached to the back cylinder head 63 prevents the second push rod 76 being moved forward beyond a preset position by a spring 82 held in tension between the bracket 72 and the arms 78, the object of the spring 82 being to keep the arms 78 and the pusher face 77 in contact.

Figure 2:
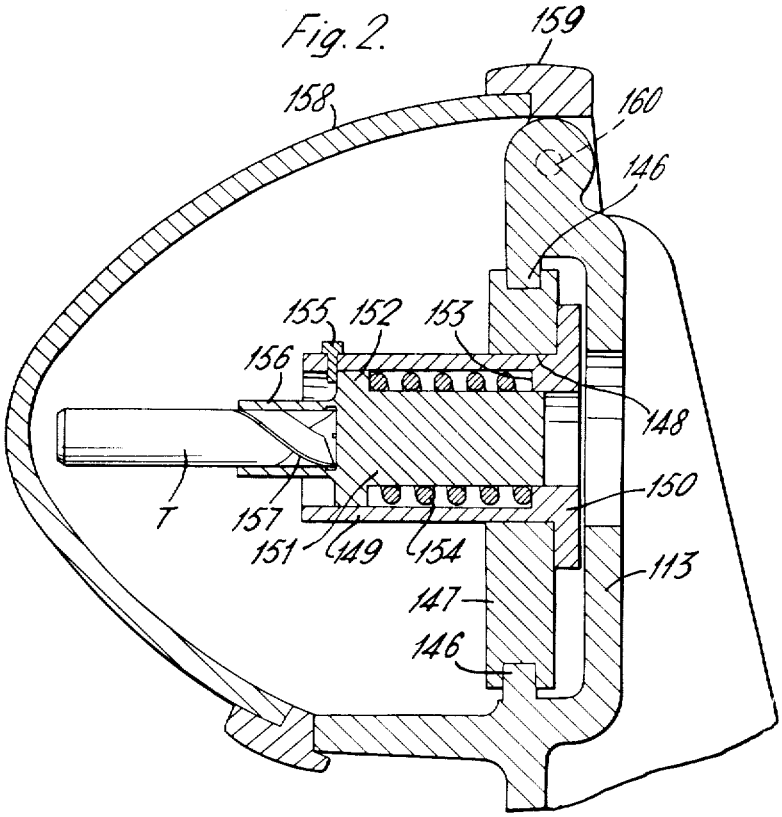
FIGURE 2 is a section through the tool magazine shown in FIGURE 1.

FIGURE 2 shows a section through the vertical slide 113 which is provided with rails 146 to take a magazine 147. The back of the magazine 147 slides on the rails 146 and its far end locks against an end stop for positive location on the vertical slide 113, the end stop and locking mechanism not being shown. Opposite each of the ten openings 114 an aligned hole 148 in the magazine 147 is adapted to hold a holster 149. The holster 149 is flanged at 150 to locate it against the back of the magazine 147 and is pinned (not shown in FIGURE 4) to prevent it moving against the vertical slide 113.

A tool-holder 151 has a shoulder 152 which is a snug fit in the holster 149. Between the shoulder 152 and a lip 153 of the holster 149 is a spring 154 which holds the tool-holder 151 firmly against a pin 155. The tool-holder 151 is provided with a thin-walled projection 156 into which the cutting end of the tool T is pushed. The bore of the thin-walled projection 156 is made to be an interference fit with the diameter of the tool T, say 0.004" smaller. Since the tool 108 has two cutting flutes 157 only there will be two point contact in any plane at right angles to the tool's longitudinal axis between the tool T and the projection 156. The thin wall enables the projection to take up an appropriate set and thus to grip the tool T firmly. The tool holder 151 is made from a suitable plastic.

A guard 158 carried in a frame 159 is hinged to the top of the vertical slide 113 at 160. The guard 158 has to be opened for changing or selecting a cutting tool, this opening being carried out automatically by a stationary ramp which lifts it when the vertical slide 113 is lowered to a position where the longitudinal axes of the cutting tools and the quills 109 and 2 are aligned. The ramp is not shown in FIGURE 2.

In operation, the pallet 104 containing two workpieces 115 and 116 and the magazine 147 containing a suitable quantity of cutting tools to carry out the requisite machining operations on the workpieces, are fed by hand to the machine and are located on the vertical slide table 113. Since the machine is provided with twin quills 109 and 2 for operating simultaneously on the two workpieces 115 and 116 it will be seen that each operation must be duplicated. In the description following only one quill 2 and one workpiece 116 will be dealt with, it being understood that the other quill 109 duplicates all movements and operations. When the pallet 104 and the magazine 147 are in position the machine is ready to start its automatic operation.

Programmed instructions in the form of a tape are fed to the control console, which is not shown, detailing the first cutting tool T to be used on the workpiece 116, its position in the magazine 147 and the nominal length of its cutting end. The actual length differs from the nominal length by the amount the cutting tool has been previously ground or by an amount representing normal manufacturers' tolerances. Servo mechanisms which are not shown in the drawings, being of known design and application, operate to lower the vertical slide table 113 until the axes of the cutting tool T and of the quill 2 are in the same horizontal plane, and to traverse the feed slide 106 until the two axes are in the same vertical plane. By the time the cutter head and the magazine are in this position it is essential that the spindle 3 should have ceased to rotate. A brake of known design and not shown in any of the figures is incorporated to stop the spindle 3 and is actuated by a positional microswitch when the vertical slide table 113 has been lowered so that the axes of the cutting tool T and of the quill 2 are in the same horizontal plane. As the vertical slide table 113 is lowered the guard 158 (FIGURE 2) is raised by means of the ramp which is not shown.

While the cutter head is moving, instructions carried on a tape activate the chuck to open. The three-way selector (which is not shown) connects the flexible hose 70 to tank. The pressure difference between the front and back sides of the cylinder 55 causes it to move forward until the front end of the front cylinder head 60 comes to rest against the back end of the nut 26. During this last movement the force exerted by the spring 73 on the piston rod 56 is sufficient to hold the piston 54 at rest and therefore to cause the cylinder 55 to move. As soon as the cylinder 55 comes to rest, the piston 54 starts to move backwards. As the piston 54 moves, the pins 57 and 58 move with it, until they come to bear against bearing ring 61 which then moves backwards. The total backward movement of the bearing ring 61, of the draw bar 52 and the piston 49, which moves with it, is of the order of .020". This movement is sufficient to compress the Belleville washers 51 further and thus to remove the forward acting force exerted by the piston 49 on the compression tube 35. As soon as this forward acting force is removed, its radial component acting through the frustro-conical ends 37 and 38 of the collet 36 on the slit sleeve 39 is also removed. The sleeve 39 is thus allowed to expand to its uncompressed diameter and the chuck is open.

When the chuck is open and the spindle 3 and the tool shank are aligned to within .003", the cutting head moves forward i.e. towards the magazine 147 to a predetermined position. The predetermined position varies with the effective length of the cutting tool selected and is regulated by the taped instructions. As the cutting head moves forward the shank of the tool is inserted into the sleeve 39. The spindle 3 is rotated slowly by cracking the control value to the hydraulic fluid jet (neither of which are shown) operating the pelton wheel 24. As soon as the dog 43 engages in the corresponding recess in the plunger 44, the spindle 3 is brought to rest. The three-way selector then admits pressure to the flexible hose 70 and thus to the position of the cylinder 55 behind the piston 54. Due to the greater cross-sectional area of the back portion of the piston 54, it moves forward until its front end comes to rest against the front end plate 65. Forward movement of the piston 54 and the piston rod 56 allows the draw bar 52 and the piston 49 to move forward. By the time the piston 54 and the cylinder 55 come to rest due to the circlip 75 coming into contact with the bracket 72, the Belleville washers 51 are again exerting the designed forward thrust on the piston 49. This thrust is transmitted directly to the compression tube 35. Due to the back frusto-conical end 38 of the collet 36 and the mating portion of the bore of the compression tube 35 this thrust is transferred into a skin force normal to the two surfaces. The normal force then has two components, a force directed radially inwards over the circumference of the back frustro-conical end 38 of the collet 36 and a forward force directed over the cylindrical portion of the collet 36. The forward force is similarly divided into two components due to the front frusto-conical end 37 and the mating portion of the bore of the nose tube 34, a radially inward force acting around the circumference of the front frusto-conical end 37 and a forward axial force. This latter forward axial force acts to wedge the front frusto-conical end 37 into the taper 33 of the nose tube 34 and to wedge the retaining ring 31 between the nose tube 34 and the mating portion of the spindle 3. Thus there are two radially inward directed forces acting on the slit sleeve 39. These forces partially close up the slits 40 and reduce the diameter of the sleeve 39 so that the tool T is gripped sufficiently tightly to resist the torque necessary for cutting. The radial forces cannot move the sleeve 39 axially, whilst any axial movement due to frictional force between the collet 36 and the sleeve 39 is resisted by the sleeve 39 being in contact with the shoulder 32 of the nose tube 34. The sleeve 39 thus remains stationary relative to the spindle 3 whilst gripping the tool T.

After the tool T is gripped the cutter head 102 moves away from the magazine withdrawing the tool T from the tool holder 151. The vertical slide table 113 rises and the slide 105 traverses until the centre of the surface 118 is approximately aligned with the longitudinal axis of the cutting tool T when both movements stop. The cutter head 102 then feeds forward on the slide 105 until it is a predetermined distance which is dependent on the nominal length of the cutting portion of the cutting tool T, from the surface 118 when it stops. Whilst it is moving towards the surface 118 the chuck opens as described hereinafter so that the tool T is movable along its axis relative to the spindle 3. The predetermined distance is dependent on taped instructions and differs for each nominal length of cutting tool. It is, however, always less than the nominal length so that as the cutting head approaches the predetermined position the front end of the tool comes to rest against the datum surface. Further forward movement of the cutting head leads to the tool moving backwards relative to the spindle 3 and to backward movement of the plunger 44 against the action of the spring 48 and of the push rod 45. Since the chuck is open, the cylinder 55 is in its forward position thus reducing the gap between the push rod 45 and the second push rod 76. Backward movement of the push rod 45 is therefore transmitted to the second push rod 76 which in its turn moves the arms 78 in an anti-clockwise direction about their pivots 79. The predetermined distance and the nominal length of the tool are chosen and calculated so that anti-clockwise movement of the arms 78 makes contact in one only of the microswitches 80. If the wrong tool is selected either both microswitches make contact or neither do, the former in the case of a tool having too great a nominal length and the latter when the nominal length is too small. Only when the correct microswitch has made contact will the machine tool continue to accept and carry out subsequent taped instructions. Thus the possibility of damage is safeguarded should a tool of incorrect length be gripped.

After the completion of the machining operation the cutting head and the empty tool storage position on the pallet are again aligned. The cutting head moves forward in the Z plane, the chuck opens and the tool is inserted into the tool storage where it is gripped. The cutting head moves backwards, the tool is left behind, and plunger 44 moves forward under the action of the spring 48. The cutting head is now in readiness to pick up the next tool for the following machining operation.

Although a machine tool has been described as shown in FIGURE 1, the invention is equally applicable to other forms. For instance the vertical worktable might be rotatable while the cutter head might also be capable of being swivelled through 90°. In this instance there would be, of course, only one quill and one workpiece.

What I claim as my invention and desire to secure by Letters Patent is:

1. A numerically controlled machine tool comprising a cutter head, a surface to which is fixed a workpiece opposed to the cutter head, and a magazine adjacent the surface containing a plurality of cutting tools having their shanks directed towards the cutter head, the cutter head having a spindle in which is located a collet actuated to close and to grip thereby the shank of a selected cutting tool and the surface having a datum pad against which the cutting end of the selected cutting tool is capable of being abutted so that the distance of the cutting end of the selected cutting tool is a predetermined distance from the cutter head.

2. A numerically controlled machine tool as claimed in claim 1, in which the collet is actuated to close by the application of a force acting in the direction of the longitudinal axis of the selected cutting tool, the said force being transformed by the collet into a gripping force acting normally to the shank of the selected cutting tool which is thereby maintained in a stationary position relative to the spindle.

3. A numerically controlled machine tool as claimed in claim 1, in which the magazine comprises a series of openings, into each of which a holster fits, each holster being adapted to grip the cutting end of a cutting tool.

4. A numerically controlled machine tool as claimed in claim 3, in which the magazine is fixed to the said surface and the holsters form an array in which the shanks of the cutting tools housed therein project parallel to each other.

5. A numerically controlled machine tool as claimed in claim 1, in which the cutter head is movable in a horizontal plane and the surface is movable in a vertical plane.

*6. A numerically controlled machine tool comprising a tool-holding member, a workpiece opposed to said tool-holding member, a magazine containing a plurality of cutting tools having their shanks directed towards the tool-holding member, the tool-holding member having tool-gripping means adapted to be actuated to close and to grip thereby the shank of the selected cutting tool from among said plurality, means to provide relative rotation between said workpiece and said selected cutting tool to effect the machining operation, and a datum surface against which the cutting end of said selected cutting tool is capable of being abutted so that the distance of said cutting end of said selected cutting tool is a predetermined distance from the tool-holding member.*

References Cited by the Examiner

The following references, cited by the Examiner, are of record in the patented file of this patent or the original patent.

UNITED STATES PATENTS

| | | | |
|---|---|---|---|
| 1,208,852 | 12/1916 | Sproul. | |
| 2,326,848 | 8/1943 | Fanning. | |
| 2,901,927 | 9/1959 | Morgan | 77—4 |
| 2,927,703 | 3/1960 | Rainey et al. | 29—568 |
| 3,064,502 | 11/1962 | Pittwood | 29—568 |
| 3,124,976 | 3/1964 | Pittwood | 77—4 |

WILLIAM W. DYER, JR., *Primary Examiner.*

L. VLACHOS, *Assistant Examiner.*